United States Patent Office 3,449,434
Patented June 10, 1969

3,449,434
1,2-METHYLENE-B-NORSTEROIDS
Kenneth G. Holden, Stratford, N.J., assignor to Smith Kline & French Laboratories, Philadelphia, Pa., a corporation of Pennsylvania
No Drawing. Filed Sept. 21, 1966, Ser. No. 580,901
Int. Cl. C07c 49/44; C12b 1/00
U.S. Cl. 260—586     4 Claims

ABSTRACT OF THE DISCLOSURE

1α,2α-methylene-B-norandrostenes, unsubstituted at the 6-position, or substituted with a 6,6-ethylene or 6-methyl group, are prepared by reaction of the corresponding 1,4-androstadienes with dimethyl sulfoxonium methylide. The products possess antiandrogenic activity.

---

This invention relates to steroid compounds having antiandrogenic activity. In particular, the invention relates to 1,2-methylene-B-nortestosterones optionally substituted at the 6-position.

The compounds of the present invention are represented by the following structural formula:

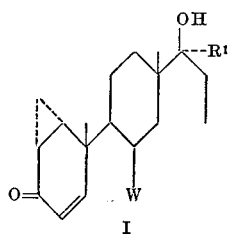

where W is CH₂

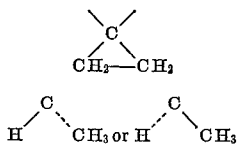

and R¹ is hydrogen or lower alkyl.

A preferred group of compounds is represented by Formula I when R¹ is methyl.

The compounds of the present invention are prepared by adding a methylene group across the 1,2-double bond of a B-nor-1,4-androstadiene of Formula II, where W and R¹ are as described above.

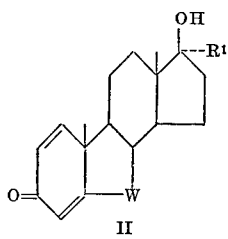

The preferred reagent for this purpose is dimethyl sulfoxonium methylide, which is formed in situ by reaction of dimethyl sulfoxide methiodide with a strong base such as sodium hydride.

When W is CH₂, the starting materials of Formula II are obtained by dehydrogenating the corresponding B-nor-steroid which is saturated at the 1,2-position either microbiologically or chemically with dichlorodicyanobenzoquinone or selenium dioxide. A suitable dehydrogenating microorganism is *Septomyxa affinis* NRRL 2746.

When W is

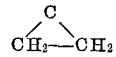

and R¹ is methyl, the starting material is prepared as follows: 17α-methylandrost-5-ene-3β,17β-diol is acetylated to give its 3,17-diacetate. Reaction with ozone, and then with zinc and acetic acid gives 3β,17β-diacetoxy-17α-methyl-5,6-secoandrostan-5-on-6-al. Oxidation with Jones reagent, followed by ring-closure with benzoyl chloride in pyridine gives 3β,17β-diacetoxy-17α-methyl-5β-hydroxy-B-norandrostan-6-carboxylic acid 5,6-lactone. Reduction with lithium aluminum hydride gives a tetrol, and oxidation with N-bromoacetamide gives 5β,17β-dihydroxy-6β-hydroxymethyl-17α-methyl-B-norandrostan-3-one. p-Toluenesulfonic acid dehydration of the 6-hydroxymethyl group and A-ring gives a 6-methylene-Δ⁴-3-ketone and subsequent reaction with dimethyl sulfoxonium methylide gives the 6,6-ethylene compound. 1,2-dehydrogenation with a reagent such as dichlorodicyanobenzoquinone gives the required starting material. Use of the known 17α-ethyl starting material in the above reaction sequence gives the required 17α-ethyl compound. The 17α-unsubstituted starting material (R¹=H) is prepared as follows: 3β-acetoxy-5β-hydroxy-17-oxo-B-norandrostan-6-carboxylic acid 5,6-lactone is reduced with lithium aluminum hydride to 6β-hydroxymethyl-B-norandrostane-3β,5β,17β-triol. Oxidation with N-bromoacetamide gives the 3,17-dione and simultaneous dehydration of the 6-hydroxymethyl group and A-ring with p-toluenesulfonic acid gives 6-methylene-B-norandrost-4-ene-3,17-dione. Reaction with dimethyl sulfoxonium methylide, reduction of the 17-ketone, reoxidation of the simultaneously reduced 3-ketone, and dehydrogenation at the 1,2-position gives the required starting material.

When W is

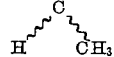

the starting materials are prepared by dehydrogenating the 6-methyl compounds saturated at the 1,2-position, which compounds are either known or are themselves prepared by catalytic hydrogenation of the 6-methylene compounds.

The 1,2-methylene group of the product compounds of this invention is believed to possess the α-configuration. This configuration of the 1,2-methylene group is accordingly designated by a dotted line. It is to be understood, however, that the invention is intended to comprehend the actual compounds prepared by the processes herein disclosed, whatever their configurations.

The compounds of the invention are antiandrogenic agents. They are to be used to alleviate conditions caused by hyperandrogenicity, such as acne and hirsutism. In standard antiandrogenic tests, they have been found to possess antiandrogenic activity when administered orally to rats at doses of 50–100 mg./kg. as sesame oil suspensions. They may be formulated into oral pharmaceutical compositions containing 5–100 mg. of active compound or into a 1–5% topical cream by methods well known to skilled pharmaceutical chemists using standard pharmaceutical excipients.

The products of the invention may be converted into their obvious 17-esters, including the acetate, propionate, butyrate, phenylpropionate, and cyclopentylpropionate by well-known acylation methods. These esters, as obvious chemical variants of the 17-alcohols, are therefore considered equivalent thereto.

The following examples are intended to illustrate the preparation of the compounds of the invention, but are not to be considered as limiting the scope thereof.

EXAMPLE 1.—17β-hydroxy-17α-methyl-1α,2α-methylene-B-norandrost-4-en-3-one

A solution of 1.0 g. of 17β-hydroxy-17α-methyl-B-norandrosta-1,4-dien-3-one in 15 ml. of dimethyl sulfoxide is treated in two portions with 25 ml. of a solution prepared from 4.2 g. of trimethyl sulfoxonium iodide, 50 ml. of dimethyl sulfoxide, and 0.84 g. of 52% sodium hydride. The solution is stirred at 25° for 3 hours, poured into water and the precipitate extracted into methylene chloride. Drying and removal of solvent gives a crystalline residue which is dissolved in 1:1 benzene-petroleum ether solution and filtered through 30 g. of neutral alumina. The alumina is washed with methylene chloride and the combined eluates are evaporated to a crystalline mass, then recrystallized from acetone-hexane solution to give the title product, M.P. 183°. UV: $\epsilon_{240\,m\mu} = 12,600$. $[\alpha]_D^{25} = +170.9°$ as 1.04% methanol solution.

When the corresponding 17α-ethyl and 17α-unsubstituted compounds are used as starting materials in the above procedure, 17α-ethyl-17β-hydroxy-1α,2α-methylene-B - norandrost - 4 - en - 3 - one and 17β - hydroxy - 1α,2α-methylene - B - norandrost - 4 - en - 3 - one, respectively, are obtained.

EXAMPLE 2.—6,6-ethylene-17β-hydroxy-17α-methyl-1α,2α-methylene-B-norandrost-4-en-3-one A solution of 0.5 g. of 6,6-ethylene-17β-hydroxy-17α-methyl-B-norandrost-4-en-3-one in 25 ml. of dioxane is heated with 0.5 g. of dichlorodicyanobenzoquinone and the solution treated at reflux temperature for 20 hours. The precipitated hydroquinone is filtered, the solvent evaporated from the filtrate and the residue then dissolved in benzene. The solution is filtered through 15 g. of alumina, the solvent removed and the crystalline residue recrystallized from acetone-hexane, then methanol-water solution to give 6,6 - ethylene - 17β - hydroxy - 17α - methyl - B-norandrosta - 1,4 - dien - 3 - one, M.P. 182°. UV: $\epsilon_{246\,m\mu} = 14,000$; $\epsilon_{284\,m\mu} = 9,400$. $[\alpha]_D^{25} = -69.6°$ as 1.01% methanol solution.

A suspension of 11.7 g. of dimethyl sulfoxide methiodide in 100 ml. of dimethyl sulfoxide is treated with 2.32 g. of 55% sodium hydride and vigorously stirred until the evolution of hydrogen has ceased. To 70 ml. of this solution 2.3 g. of 6,6-ethylene-17β-hydroxy-17α-methyl-B-norandrosta-1,4-dien-3-one is added and the solution heated at 50° for 3.5 hours. The reaction solution is cooled, poured into 800 ml. of water, filtered, washed with n-hexane, then water. The crude product is recrystallized from acetone-hexane and methanol-water solutions to give 6,6-ethylene-17β-hydroxy-1α,2α-methylene-17α - methyl - B - norandrost - 4 - en - 3 - one, M.P. 203°. UV: $\epsilon_{261\,m\mu} = 12,600$. $[\alpha]_D^{25} = +117.0°$ as 1.061% methanol solution.

When 6,6 - ethylene - 17β - hydroxy - B - norandrost-4-en-3-one and 17α - ethyl - 6,6 - ethylene - 17β - hydroxy-B-norandrost-4-en-3-one are substituted for the 17α-methyl starting material and the above dehydrogenation and methylene addition reactions are performed, 6,6-ethylene-17β - hydroxy - 1α,2α - methylene - B - norandrost - 4 - en-3 - one and 17α - ethyl - 6,6 - ethylene - 17β - hydroxy-1α,2α - methylene - B - norandrost - 4 - en - 3 - one, respectively are obtained.

When 17β - hydroxy - 6 - methyl - B - norandrost - 4-en - 3 -one, 17β - hydroxy - 6,17α - dimethyl - B - norandrost - 4 - en - 3 - one, and 17α - ethyl - 17β - hydroxy-6 - methyl - B - norandrost - 4 - en - 3 - one are used as starting materials in the above dehydrogenation and methylene addition reactions, 17β-hydroxy-6-methyl-1α,2α-methylene - B - norandrost - 4 - en - 3 - one, 17β - hydroxy - 6,17α - dimethyl - 1α,2α - methylene - B - norandrost - 4 - en - 3 - one, and 17α - ethyl - 17β - hydroxy-6 - methyl - 1α,2α - methylene - B - norandrost - 4 - en - 3-one, respectively, are obtained.

PREPARATION OF STARTING MATERIALS

17β-hydroxy-17α-methyl-B-norandrosta-1,4-dien-3-one

A fermentation medium composed of 10 liters of corn steep liquor adjusted to pH 6.3–6.5 with sodium hydroxide solution is autoclaved for 2 hours at 15 p.s.i. at 121°. The medium is inoculated with a standard preparation of *Septomyxa affinis* NRRL 2746. Fermentation growth is carried out for 48 hours with aeration at 3 liters of air per minute per 10 liters and impeller speed of 200 r.p.m.

Five grams of 17β-hydroxy-17α-methyl-B-norandrost-4-en-3-one is dissolved in 50 ml. of 95% ethanol and added beneath the surface of the medium: 1 g. after 48 hours, 2 g. after 55 hours, 1 g. after 72 hours and 1 g. after 78 hours.

After the transformation is complete, the mixture is centrifuged. The recovered solids are extracted with ethanol and then ethanol-methylene chloride. The extracts are filtered and added to the clarified broth which is exhaustively extracted with methylene chloride. After drying, the extracts are evaporated in vacuo at 50°.

The residue is taken into petroleum ether-benzene and chromatographed over alumina (Woelm, III). The fractions eluted with benzene-petroleum ether (1:1) through benzene-methylene chloride (1:1) are combined and evaporated. The solid residue is recrystallized from acetone-hexane to give 17β-hydroxy-17α-methyl-B-norandrosta-1,4-en-3-one, M.P. 140–141° after sublimation.

Use of 17β - hydroxy - B - norandrost - 4 - en - 3 - one and 17α - ethyl - 17β - hydroxy - B - norandrost - 4 - en-3-one as substrates in the above procedure gives 17β-hydroxy - B - norandrosta - 1,4 - dien - 3 - one and 17α-ethyl-17β-hydroxy-B-norandrosta-1,4-dien-3-one.

6,6-ethylene-17β-hydroxy-17α-methyl-B-norandrost-4-en-3-one

Reflux a mixture of one part 17α-methylandrost-5-ene-3β,17β-diol (60 grams) and 5 parts acetic anhydride (300 ml.) for one hour. Over the next hour, distill to remove 3½ parts (210 ml.) of distillate. Cool somewhat and then strip in vacuo to a crystalline slurry. Add water (ca. 2 parts, 120 ml.) and stir for one hour to decompose anhydride. Dilute with water, stir for 15 minutes, filter and wash with water to obtain a slightly tacky crystalline solid. Transfer to a flask, add 2 parts (120 ml.) methanol and stir and reflux for 15–20 minutes. Allow to cool to room temperature, filter, wash with 1–1.5 parts (60–90 ml.) methanol and dry. Weight of the 3,17-diacetate is 64 grams, M.P. 137–139°, which is of sufficient purity for the next reaction.

Dissolve 24 grams of 17α-methylandrost-5-ene-3β,17β-diol, 3,17-diacetate in 30 parts (720 ml.) methylene chloride containing 1% methanol (7.2 ml.). Cool in acetone-Dry Ice bath and ozonize with oxygen-ozone mixture until solution takes on a permanent blue color indicating presence of excess ozone. Transfer to an ice-salt bath and add 3 parts (72 g.) of zinc dust. To the stirred mixture slowly add 4 parts (96 ml.) of acetic acid. Stir in ice bath for one hour, then remove bath and stir for one hour at room temperature. Filter off zinc and wash well with methylene chloride. Wash solution with water, bicarbonate, and water. Dry solution over $Na_2SO_4$, then remove solvent in vacuo and crystallize the residue from ether-petroleum ether to obtain 17 grams of 3β, 17β-diacetoxy - 17α - methyl-5,6-secondrostan-5-on-6-al, M. P. 118–120°. Recrystallized product melts at 122–124°. The mother liquor contains additional aldehyde which can be processed further to the lactone. Unless crystalline aldehyde is desired the total residue from the ozonization is oxidized to the carboxylic acid and converted into the lactone without isolation. For this the $CH_2Cl_2$ solution is concentrated to 4 parts by volume (ca. 100 ml.).

Dilute solution of 6-aldehyde in 4 parts of $CH_2Cl_2$ with 8 parts (200 ml.) of acetone. Stir and cool in ice bath to 3–5°. Over a 3 to 5 minute period add 0.8 part (19.2 ml.) of Jones oxidizing reagent whereby temperature may rise to 10–12°. After the addition, stir for 10–15 minutes more, then add 800 ml. water. Extract with CH$_2$Cl$_2$ and wash with water to remove Cr salts. Concentrate in partial vacuum to remove solvent and obtain an oily residue of the 6-oic acid. Dissolve residue in 5 parts (120 ml.) pyridine and stir and cool in an ice bath. Add dropwise 1.1 parts (26.4 ml.) of benzoyl chloride, then stir in bath for a half hour. Remove from bath and stir at room temperature for 3 hours (or longer). Add 1 part water (24 ml.) and stir for one hour at room temperature. Dilute with water and extract with benzene-ether. Wash solution successively with water, dilute HCl, water, dilute NaOH, and water. Concentration in vaco to a crystalline residue, add methanol, stir and concenrate to remove benzene, ending up in methanol at a volume of 2 parts (ca. 50 ml.). Cool, filter, and wash with MeOH. Yield of 3β,17β - diacetoxy-17α-methyl-5β - hydroxy-B-norandrostan-6-carboxylic acid 5,6-lactone is 18.5–19.2 g., M.P. 167–169°.

Under nitrogen add portionwise 6.5 grams of LiAlH$_4$ to a stirred mixture of 13 grams of the lactone in 500 ml. of tetrahydrofuran. After the addition, reflux for 2 hours, then cautiously add mixture of 25 ml. water and 50 ml. tetrahydrofuran to decompose excess reagent. Reflux gently for a half hour, filter, and wash with tetrahydrofuran. Remove solvent in vacuo to a mostly crystalline residue which is taken up in methanol and benzene. Concentrate to remove methanol and to crystallize in benzene. Allow to cool to room temperature, filter, wash with benzene to obtain 6β-hydroxymethyl-17α-methyl-B-norandrostane-3β,5β,17β-triol, M. P. 200–210°, which is of sufficient purity for the next oxidation step. The tetrol can be recrystallized from MeOH, M.P. 217–219°.

Stir a mixture of 10 grams of the tetrol in 200 ml. t-butyl alcohol and 200 ml. methanol. Add 8 ml. pyridine, followed by 6.6 grams N-bromoacetamide. Stir in dark overnight. Add 60 ml. water and 3.3 grams NaHSO$_3$ and stir to decolorize. Concentrate in vacuo to remove solvents and obtain a thick slurry which is then diluted with waer to 200–250 ml. volume. Stir for one hour and filter and wash with water. Weight of 5β,17β-dihydroxy-6β-hydroxymethyl - 17α-methyl-B-norandrostan-3-one after drying is 8.0–8.3 grams, M.P. 170–175°.

To a stirred mixture of 10 grams of the triol ketone in 900 ml. benzene and 100 ml. dioxane maintained at 40° by means of a bath, add 1.25 g. of p-toluenesulfonic acid. Stir for several hours at 40°, then slowly raise temperature to 50–55°. Continue reaction to completion as determined by T.L.C. so as to dehydrate tto the 3-keto-Δ$^4$ and to the 6-methylene with minimum loss of the 17-hydroxy group. This will require 6–8 hours time, during which the solution gradually develops color. At end of reaction, wash benzene solution with water, Na$_2$CO$_3$ and water. Dry over Na$_2$SO$_4$ and remove solvent in vacuo to a mostly crystalline residue which is digested in ether, filtered, and washed with ether to give the 6-methylene-17β - hydroxy-17α-methyl-B-norandrost-4-en-3-one, M.P. 162–165°.

Under nitrogen, add in portions 0.65 gram of 55% NaH to 3.3 grams of dimethyl sulfoxide methiodide in 50 ml. dimethyl sulfoxide. Stir for 20 minutes to obtain complete solution, then add 3.0 g. of the 6-methylene compound. Stir at room temperature for one hour, then an additonal hour at 45–50°. Pour reaction mixture into ice and water and dilute to 400 ml. Filter and wash with water. Dissolve wet cake in benzene (with aid of MeOH) and dilute with ether. Wash solution successively with water, dilute NaOH, and water, discarding small cuffs obtained. Dry over Na$_2$SO$_4$, remove solvent in vacuo to a crystalline residue which is then crystallized from acetone-hexane or from ethyl acetate. The product, 6,6-ethylene - 17β - hydroxy-17α-methyl-B-norandrost-4-en-3-one, melts at 187–189°.

The 17α - ethyl-6,6-ethylene-17β-hydroxy-B-norandrost-4-en-3-one is prepared in the same manner from the known 17β-ethylandrost-5-ene-3β,17β-diol.

6,6-ethylene-17β-hydroxy-B-norandrost-4-en-3-one

To a stirred suspension of 20 g. of lithium aluminum hydride in 700 ml. of tetrahydrofuran under a nitrogen atmosphere is slowly added 30 g. of 3β-acetoxy-5β-hydroxy-17-oxo-B-norandrostan-6-carboxylic acid 5,6-lactone [Tanabe et al., Chem. Pharm. Bull., 9, 12 (1961)] in 250 ml. of tetrahydrofuran. After addition is complete, the reaction mixture is stirred at reflux for 2 hours. After cooling with an ice bath, the reaction mixture is slowly treated with 80 ml. of water in 100 ml. of tetrahydrofuran. The resulting white precipitate is removed by filtration and washed with fresh tetrahydrofuran. Evaporation of the filtrate gives a residue of 6β-hydroxymethyl-B-norandrostane-3β,5β,17β-triol, M.P. 166–170° after crystallization from ethyl acetate.

To a stirred solution of 60 g. of N-bromoacetamide in 1 l. of methanol, protected from direct light, is added 18 ml. of pyridine, 60 ml. of water and 18 g. of the above tetrol. After stirring at room temperature for 16 hours, 40 g. of solid Na$_2$SO$_3$, followed by 400 ml. of water is added, stirring is continued for a few minutes, and finally the reaction mixture is concentrated to 500 ml. at reduced pressure. The warm mixture is diluted with 1.5 l. of water, cooled, and filtered to give crystalline 6β - hydroxymethyl-5β-hydroxy-B-norandrostane - 3,17-dione, M.P. 178–180° after recrystallization from ethyl acetate.

A solution of 5 g. of the above diketone in 500 ml. of benzene containing 0.5 g. of p-toluenesulfonic acid is stirred at room temperature under nitrogen for 10 hours. The reaction mixture is washed with dilute aqueous sodium carbonate solution, dried, and evaporated to a residue of 6-methylene-B-norandrost-4-ene-3,17 - dione, which after recrystallization from methanol has M.P. 143–148°, UV: λ max. 283 mμ (ε 15,500).

To a stirred solution of 9.3 g. of dimethyl sulfoxide methiodide in 90 ml. of dimethyl sulfoxide under a nitrogen atmosphere is slowly added 1.6 g. of NaH as a 55% mineral oil suspension. After stirring for 10 minutes, 10 g. of the 6-methylene compound in 150 ml. of dimethyl sulfoxide is added. The reaction mixture is stirred for 30 minutes at room temperature and then at 60° for 45 minutes. It is then poured into water and extracted with benzene. Evaporation of the dried benzene extracts gives a residue of 6,6-ethylene-B-norandrost-4-ene-3,17-dione, M.P. 205–209°, UV: λ max. 262 mμ (ε 15,900) after recrystallization from acetone-hexane.

To a stirred suspension of 1.7 g. of LiAlH$_4$ in 85 ml. of ether under a nitrogen atmosphere is slowly added 6.8 g. of 6,6-ethylene-B-norandrost-4-ene-3,17-dione in 110 ml. of tetrahydrofuran. After addition is complete, the reaction mixture is refluxed for 2 hours, cooled, treated with 7 ml. of water in 20 ml. of tetrahydrofuran, filtered and the filtrate evaporated to a crude residue of 6,6-ethylene-B-norandrost-4-ene-3β,17β-diol. Without further purification the crude diol is dissolved in 100 ml. of dioxane and treated with 5.7 g. of 2,3-dichloro-5,6-dicyanobenzoquinone in 70 ml. of dioxane. After 5 hours at room temperature, the reaction mixture is filtered and the filtrate is evaporated to a residue which is dissolved in methylene chloride-benzene (1:1) and chromatographed on 200 g. of alumina (activity III, Woelm). Elution with methylene chloride-benzene (1:1) and methylene chloride gives 6,6-ethylene-17β-hydroxy-B-norandrost-4-en-3-one, M.P. 175–177° after recrystallization from ethyl acetate.

17β-hydroxy-6,17α-dimethyl-B-norandrost-4-en-3-one

To a Parr hydrogenation bottle is added 300 mg. of 5% Pd/CaCO$_3$, 75 ml. of methanol, 4.5 ml. of pyridine, and a solution of 3.0 g. of 17β-hydroxy-17α-methyl-6-methylene-B- norandrost-4-en-3-one in 75 ml. of methylene chloride. The hydrogenation is conducted at 20 p.s.i.

for ½ hour by which time one mole of hydrogen has been absorbed. The catalyst is filtered off and the filtrate evaporated in vacuo to an oil which is a mixture of the 6α and 6β-methyl isomers. The isomers can be separated by crystallization or by neutral alumina chromatography. Crystallization of the oil from ether gives the less soluble 6α-isomer, M.P. 178–180°, and crystallization of the remaining oil from ether-petroleum ether gives the more soluble 6β-isomer, M.P. 137–140°; recrystallized 140–141°. By chromatography, the 6β-isomer is eluted from the alumina column with 1:1 benzene-petroleum ether and the 6α-isomer with benzene. Mixtures of the isomers are isomerized to the 6β-isomer by treatment with alcoholic alkali.

The 17α-ethyl - 17β-hydroxy-6-methyl-B-norandrost-4-en-3-one starting material is prepared in the same manner from the corresponding 17α-ethyl-6-methylene compound.

The 17β - hydroxy-6-methyl-B-norandrost - 4-en-3-one starting material is a known compound.

I claim:
1. A compound of the formula

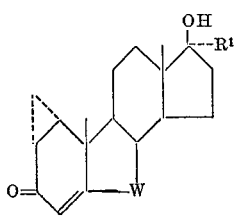

where W is

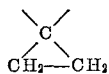

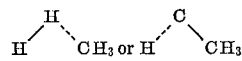

and $R^1$ is hydrogen, methyl, or ethyl.

2. A compound as claimed in claim 1, where W is

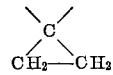

3. A compound as claimed in claim 2, where $R^1$ is methyl, being the compound 6,6-ethylene-17β-hydroxy-17α-methyl-1α,2α-methylene-B-norandrost-4-en-3-one.

4. A compound as claimed in claim 1, being the compound 17β-hydroxy - 6,17α-dimethyl-1α,2α-methylene-B-norandrost-4-en-3-one.

References Cited

UNITED STATES PATENTS 3,356,716  12/1967  Holden _____ 260—488

FOREIGN PATENTS 6,503,784  9/1965  Netherlands.

OTHER REFERENCES

Saunders et al.: Chem. Abst., vol. 61, col. 8594B, (1964).

Fieser et al.: Steroids, p. 519 (1959).

LEON ZITVER, *Primary Examiner.*

M. M. JACOB, *Assistant Examiner.*

U.S Cl. X.R.

196—51; 260—343.9, 468, 476, 488, 617; 424—243